United States Patent
Horiike

(10) Patent No.: US 11,175,763 B2
(45) Date of Patent: Nov. 16, 2021

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Yoshiteru Horiike, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/565,020

(22) Filed: Sep. 9, 2019

(65) Prior Publication Data
US 2019/0391697 A1    Dec. 26, 2019

Related U.S. Application Data

(63) Continuation of application No. 15/875,998, filed on Jan. 19, 2018, now Pat. No. 10,459,558, which is a continuation of application No. 14/793,442, filed on Jul. 7, 2015, now Pat. No. 9,910,522.

(30) Foreign Application Priority Data

Jul. 10, 2014  (JP) ................................ 2014-142729

(51) Int. Cl.
*G06F 3/041* (2006.01)
*H04N 1/00* (2006.01)

(52) U.S. Cl.
CPC ....... *G06F 3/0412* (2013.01); *H04N 1/00411* (2013.01); *H04N 1/00424* (2013.01); *H04N 1/00514* (2013.01); *G06F 2203/04104* (2013.01)

(58) Field of Classification Search
CPC ........ G06F 3/0412; G06F 2203/04104; H04N 1/00411; H04N 1/00424; H04N 1/00514; H04N 1/00408; H04N 1/00474
See application file for complete search history.

(56) References Cited

U.S. PATENT DOCUMENTS

| | | | | |
|---|---|---|---|---|
| 9,357,134 B2 * | 5/2016 | Shimosato | ............ | G06F 3/0412 |
| 9,459,789 B2 * | 10/2016 | Yamamoto | ............ | G06F 3/0416 |
| 9,575,649 B2 * | 2/2017 | Wei | ........................ | G06F 3/0412 |
| 9,595,186 B2 * | 3/2017 | Kim | ...................... | G06F 3/0486 |
| 9,811,199 B2 * | 11/2017 | Nagata | ................ | G06F 3/04883 |
| 10,061,507 B2 * | 8/2018 | Fleizach | ................. | G06F 3/041 |

(Continued)

FOREIGN PATENT DOCUMENTS

| | | | |
|---|---|---|---|
| CN | 101356492 A | | 1/2009 |
| CN | 101464778 A | | 6/2009 |

(Continued)

*Primary Examiner* — Amy Onyekaba
(74) *Attorney, Agent, or Firm* — Canon U.S.A., Inc. IP Division

(57) ABSTRACT

An information processing apparatus having a touch panel display includes a first detection unit configured to detect that an object touches the touch panel display, and a second detection unit configured to detect that the object touches an area of a display item on the touch panel display and then detect that the object moves outside the area of the display item while touching the touch panel display. When the display item is in a flick or drag operation detectable area, the information processing apparatus performs control not to carry out processing associated with the display item in response to the detection by the second detection unit.

18 Claims, 8 Drawing Sheets

(56) References Cited

U.S. PATENT DOCUMENTS

| | | | |
|---|---|---|---|
| 10,185,483 B2* | 1/2019 | Awano | H04N 1/00482 |
| 2003/0236109 A1* | 12/2003 | Nagata | G06F 3/038 |
| | | | 455/575.1 |
| 2008/0036743 A1* | 2/2008 | Westerman | G06F 3/038 |
| | | | 345/173 |
| 2008/0165160 A1* | 7/2008 | Kocienda | H04M 1/72403 |
| | | | 345/175 |
| 2008/0174570 A1 | 7/2008 | Jobs et al. | |
| 2008/0256472 A1* | 10/2008 | Kim | G06F 3/0482 |
| | | | 715/769 |
| 2009/0183100 A1* | 7/2009 | Eom | G06F 3/04883 |
| | | | 715/769 |
| 2011/0157047 A1* | 6/2011 | Nakagawa | G06F 3/0482 |
| | | | 345/173 |
| 2011/0157048 A1* | 6/2011 | Nakatani | G06F 3/0485 |
| | | | 345/173 |
| 2011/0221948 A1* | 9/2011 | Saito | G06F 3/04847 |
| | | | 348/333.01 |
| 2011/0242024 A1* | 10/2011 | Fukumoto | H04N 1/00424 |
| | | | 345/173 |
| 2011/0258547 A1* | 10/2011 | Symons | G06F 3/04817 |
| | | | 715/723 |
| 2012/0044266 A1* | 2/2012 | Mori | G09G 5/34 |
| | | | 345/649 |
| 2012/0120002 A1 | 5/2012 | Ota | |
| 2012/0134642 A1* | 5/2012 | Okamura | H04N 5/2252 |
| | | | 386/230 |
| 2012/0146929 A1* | 6/2012 | Oyama | H04N 5/232941 |
| | | | 345/173 |
| 2012/0284673 A1 | 11/2012 | Lamb et al. | |
| 2013/0002599 A1* | 1/2013 | Townsley | G06F 3/04842 |
| | | | 345/174 |
| 2013/0120289 A1* | 5/2013 | Seto | G06F 3/0488 |
| | | | 345/173 |
| 2013/0139100 A1* | 5/2013 | Horiike | G06F 3/0485 |
| | | | 715/784 |
| 2013/0176256 A1* | 7/2013 | Hara | G06F 3/04855 |
| | | | 345/173 |
| 2013/0201128 A1* | 8/2013 | Matsushima | G06F 3/0482 |
| | | | 345/173 |
| 2013/0201221 A1* | 8/2013 | Takase | G06F 3/041 |
| | | | 345/667 |
| 2013/0208291 A1* | 8/2013 | Ikeda | H04N 1/00474 |
| | | | 358/1.13 |
| 2013/0208313 A1* | 8/2013 | Maeda | G06F 3/0483 |
| | | | 358/1.15 |
| 2013/0208314 A1* | 8/2013 | Yamada | H04N 1/00466 |
| | | | 358/1.15 |
| 2013/0212531 A1* | 8/2013 | Yoshida | G06F 3/0482 |
| | | | 715/829 |
| 2013/0241847 A1* | 9/2013 | Shaffer | G06F 3/04883 |
| | | | 345/173 |
| 2013/0321474 A1* | 12/2013 | Horiike | G06F 3/0488 |
| | | | 345/684 |
| 2013/0332884 A1* | 12/2013 | Hitosuga | H04N 1/00416 |
| | | | 715/810 |
| 2014/0006985 A1* | 1/2014 | Matsushima | G06F 3/04817 |
| | | | 715/765 |
| 2014/0007018 A1 | 1/2014 | Shitrit et al. | |
| 2014/0019911 A1* | 1/2014 | Yoshimi | G06F 3/04892 |
| | | | 715/810 |
| 2014/0059500 A1* | 2/2014 | Kanno | G06F 3/0481 |
| | | | 715/863 |
| 2014/0063321 A1* | 3/2014 | Nabeshima | G06F 3/04883 |
| | | | 348/333.12 |
| 2014/0078370 A1* | 3/2014 | Yoshimi | H04N 1/00411 |
| | | | 348/333.01 |
| 2014/0078371 A1* | 3/2014 | Kinoshita | H04N 5/232935 |
| | | | 348/333.02 |
| 2014/0098059 A1* | 4/2014 | Ichikawa | G06F 3/0446 |
| | | | 345/174 |
| 2014/0098255 A1* | 4/2014 | Miura | G06F 3/0416 |
| | | | 348/208.99 |
| 2014/0145991 A1* | 5/2014 | Tamai | G06F 3/0488 |
| | | | 345/173 |
| 2014/0293338 A1* | 10/2014 | Murakami | G06F 3/0485 |
| | | | 358/1.15 |
| 2014/0351698 A1* | 11/2014 | Nakagawa | G06F 3/0488 |
| | | | 715/702 |
| 2015/0100919 A1* | 4/2015 | Takagi | H04N 5/232933 |
| | | | 715/798 |
| 2015/0365306 A1* | 12/2015 | Chaudhri | G06F 3/0484 |
| | | | 715/736 |
| 2016/0085401 A1* | 3/2016 | Takimoto | G06F 3/04883 |
| | | | 715/765 |
| 2016/0196058 A1* | 7/2016 | Kim | G06F 3/04886 |
| | | | 715/739 |
| 2018/0067624 A1* | 3/2018 | Laubach | G06F 3/04895 |
| 2020/0089380 A1* | 3/2020 | Harada | G06F 3/0486 |

FOREIGN PATENT DOCUMENTS

| | | |
|---|---|---|
| CN | 101627361 A | 1/2010 |
| CN | 102196178 A | 9/2011 |
| JP | 2009-151691 A | 7/2009 |
| JP | 2009-169938 A | 7/2009 |
| JP | 2011-134212 A | 7/2011 |
| JP | 2011-210009 A | 10/2011 |
| JP | 2013-178520 A | 9/2013 |
| JP | 5505550 B1 | 5/2014 |
| KR | 20090107530 A | 10/2009 |

* cited by examiner

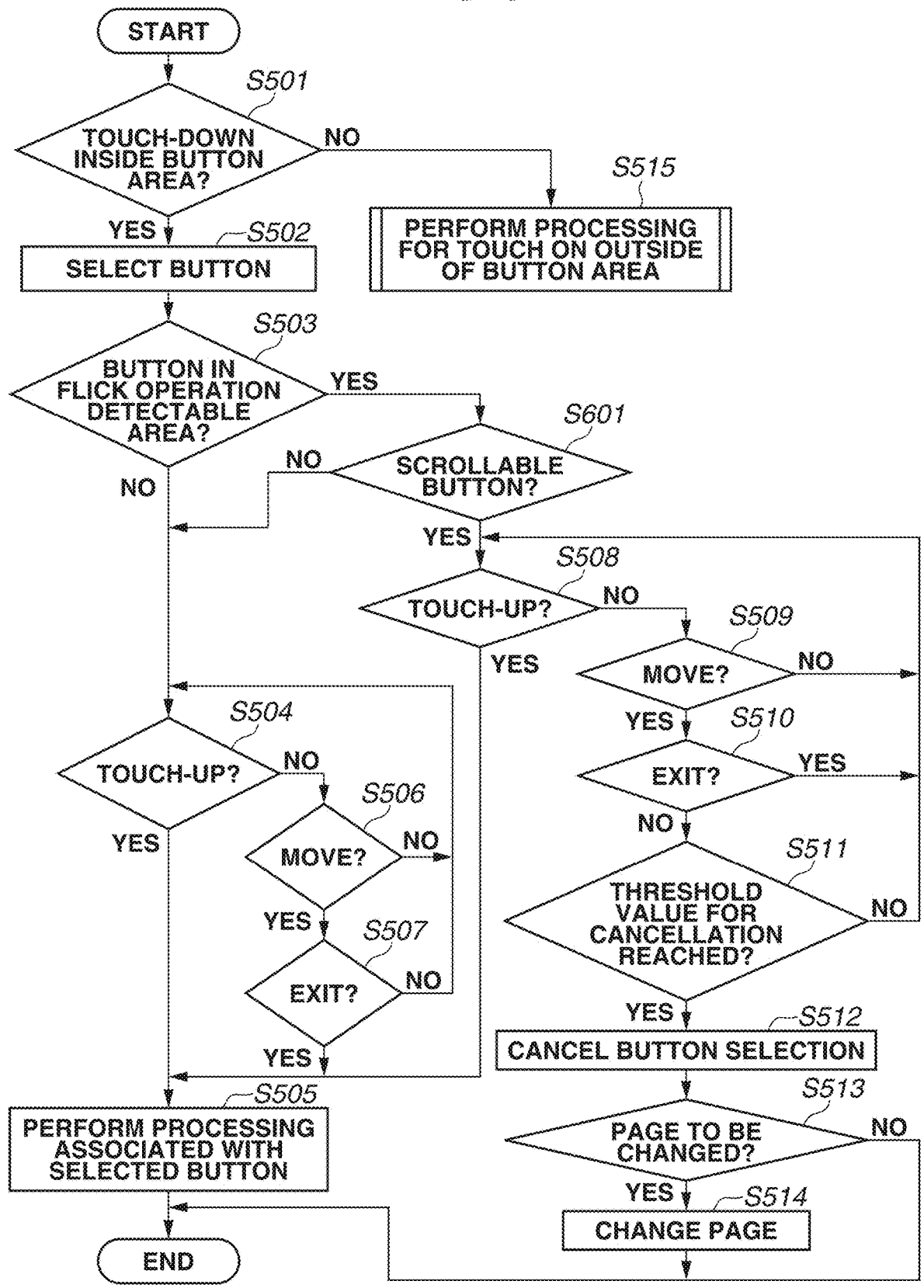

INFORMATION PROCESSING APPARATUS, METHOD FOR CONTROLLING THE SAME, AND STORAGE MEDIUM

CROSS-REFERENCE TO RELATED APPLICATIONS

This application is a Continuation of U.S. application Ser. No. 15/875,998, filed Jan. 19, 2018, now U.S. Pat. No. 10,459,558 B2, which is a Continuation of U.S. application Ser. No. 14/793,442, filed Jul. 7, 2015, now U.S. Pat. No. 9,910,522 B2, which claims the benefit of priority from Japanese Patent Application No. 2014-142729 filed Jul. 10, 2014, which are each hereby incorporated by reference herein in their entireties.

BACKGROUND

Field of the Disclosure

The present disclosure generally relates to information processing and, more particularly, to an information processing apparatus having a touch panel display, a method for controlling the information processing apparatus, and a storage medium.

Description of the Related Art

In recent years, image forming apparatuses having a touch panel display have been commonly used. Such an image forming apparatus is provided with various applications such as copy, print, scan, and FAX transmission. A user is able to make setting for each application and instruct the apparatus to start processing of each application by performing touch operations on software buttons on the touch panel display.

Button control on a touch panel display will be described below with reference to FIGS. 7A to 7D. FIG. 7A illustrates an appearance of the touch panel display. The touch panel display includes a touch panel area 701 which is comprised of a liquid crystal display (LCD) and a touch panel stuck thereon. The touch panel display further includes software buttons 702 and 703. FIGS. 7B and 7C are sectional views illustrating the touch panel taken along a line 704 illustrated in FIG. 7A, and touch operations by the user. A section 706 is equivalent to a line 707, and a width 705 of the button 702 in the X direction is equivalent to a button 708. Since the software buttons 702 and 703 on the touch panel display are 2-dimensionally formed, to make determinations in the X and the Y directions, it is necessary to detect a touch position. However, since these determinations are similarly handled, one-dimensional representations are used to simplify descriptions in FIGS. 7B and 7C.

Generally, there are the following two different cases in button determination:
A. When the apparatus detects that a button area is pressed by the finger of a user, the apparatus performs processing associated with the pressed button.
B. When the apparatus detects that a button area is pressed by the finger of a user and then the finger is detached from the relevant button area, the apparatus performs processing associated with the pressed button.

In a case of A, since the button operation by the user is input as soon as the user touches the button, the user can feel a light touch input. For example, when a calculator having large buttons is displayed, the feeling of operation can be improved. However, in a case of A, even if the user touches a button by mistake, the button operation by the user is input as soon as the button is touched. To address this problem, the method in a case of B is used to provide accuracy in button depression. Case B is a case which is a subject of exemplary embodiments of the present invention and will be described in detail below.

FIG. 7B illustrates a case where the user touches a button area (709) with the finger and then detaches the finger from the button area (710). In this case, when the apparatus detects that the finger touches the button area, the relevant button is put in the selection state. Then, when the apparatus detects that the finger is detached from the button area, the apparatus performs processing associated with the selected button. For example, when a copy button on a menu screen is selected, the screen changes to a copy application setting screen. When a color setting button on the copy application setting screen is selected, the screen changes to a color setting screen.

FIGS. 7C and 7D illustrate a case where the user touches a button area (711) with the finger, moves the finger outside the button area while keeping it in contact with the button area, and then detaches the finger (712). In this case, when the apparatus detects that the finger has been moved outside the button area as illustrated in FIG. 7C, the button selection is canceled. Therefore, if the user presses a button by mistake, the user is able to cancel execution of processing associated with the button by moving the finger out of the button area while keeping it in contact with the button area, and then detaching the finger.

However, in a case of a small-sized button such as the button 703, the user's finger may be moved out of the button area by slight motion of the finger although the user thinks the finger is detached from the button area after touching the button inside the button area. As a result, the execution of processing associated with the button will be canceled despite the user's intention.

To solve such a problem, an image forming apparatus performs control in the following way. When the apparatus detects that the finger of a user touches a button area and then the finger is moved out of the button area, the apparatus performs processing associated with the button as illustrated in FIG. 7D. By performing such control, even if the user operates a small-sized button, the execution of processing associated with the button can be prevented from being canceled despite the user's intention.

Lately, some image forming apparatuses have a touch panel display supporting flick operations. A flick operation refers to an operation in which the user quickly flips the surface of the touch panel display with the finger. Japanese Patent Application Laid-Open No. 2011-210009 discusses an image forming apparatus which is provided with a plurality of applications such as copy and print, and displays a menu screen arranging icons for selecting applications to be used. Japanese Patent Application Laid-Open No. 2011-210009 discusses a technique for smoothly scrolling the screen with a flick operation to change pages when icons do not fit into one page of the menu screen, so that the user can select an arbitrary application out of the plurality of applications provided by the image forming apparatus.

However, when it is enabled to perform flick operations in an image forming apparatus which performs button control as illustrated in FIG. 7D, the following problems will arise. More specifically, in a case where the user performs the flick operation in a button area, processing associated with the button will be performed when the user moves the finger out of the relevant button area. As a result, although the user performs a flick operation to change a page, processing associated with the button will be performed despite the user's intention.

Such a problem is not limited to a button, and may commonly arise with any display item which is scrollable by a flick or drag operation and is associated with processing to be performed when pressed by the user.

SUMMARY

The present disclosure is directed to preventing selection of a display item from being canceled despite the user's intention and to preventing processing associated with a display item from being performed despite the user's intention when a flick or drag operation is performed on the display item.

According to an aspect of the present disclosure, an information processing apparatus having a touch panel display includes a first detection unit configured to detect that an instruction object touches the touch panel display, a second detection unit configured to detect that the instruction object is moving while touching the touch panel display, and a third detection unit configured to detect that the instruction object having been held in contact with the display is detached therefrom. The information processing apparatus further includes a control unit configured to, in a case where the first detection unit detects that an instruction object touches an area of a display item on the touch panel display and then the second detection unit detects that the instruction object is moving while touching the touch panel display, perform control to carry out processing associated with the display item when the third detection unit detects that the instruction object is detached from the touch panel display before a moving distance of the instruction object reaches a predetermined threshold value, and not to perform control to carry out processing associated with the display item when the moving distance of the instruction object reaches the predetermined threshold value before the third detection unit detects that the instruction object is detached from the touch panel display.

Further features of the present disclosure will become apparent from the following description of exemplary embodiments with reference to the attached drawings.

BRIEF DESCRIPTION OF THE DRAWINGS

FIG. 6 is a flowchart illustrating operations of an image forming apparatus according to a second exemplary embodiment.

DESCRIPTION OF THE EMBODIMENTS

Various exemplary embodiments, features, and aspects of the disclosure will be described in detail below with reference to the drawings.

Figure 1:
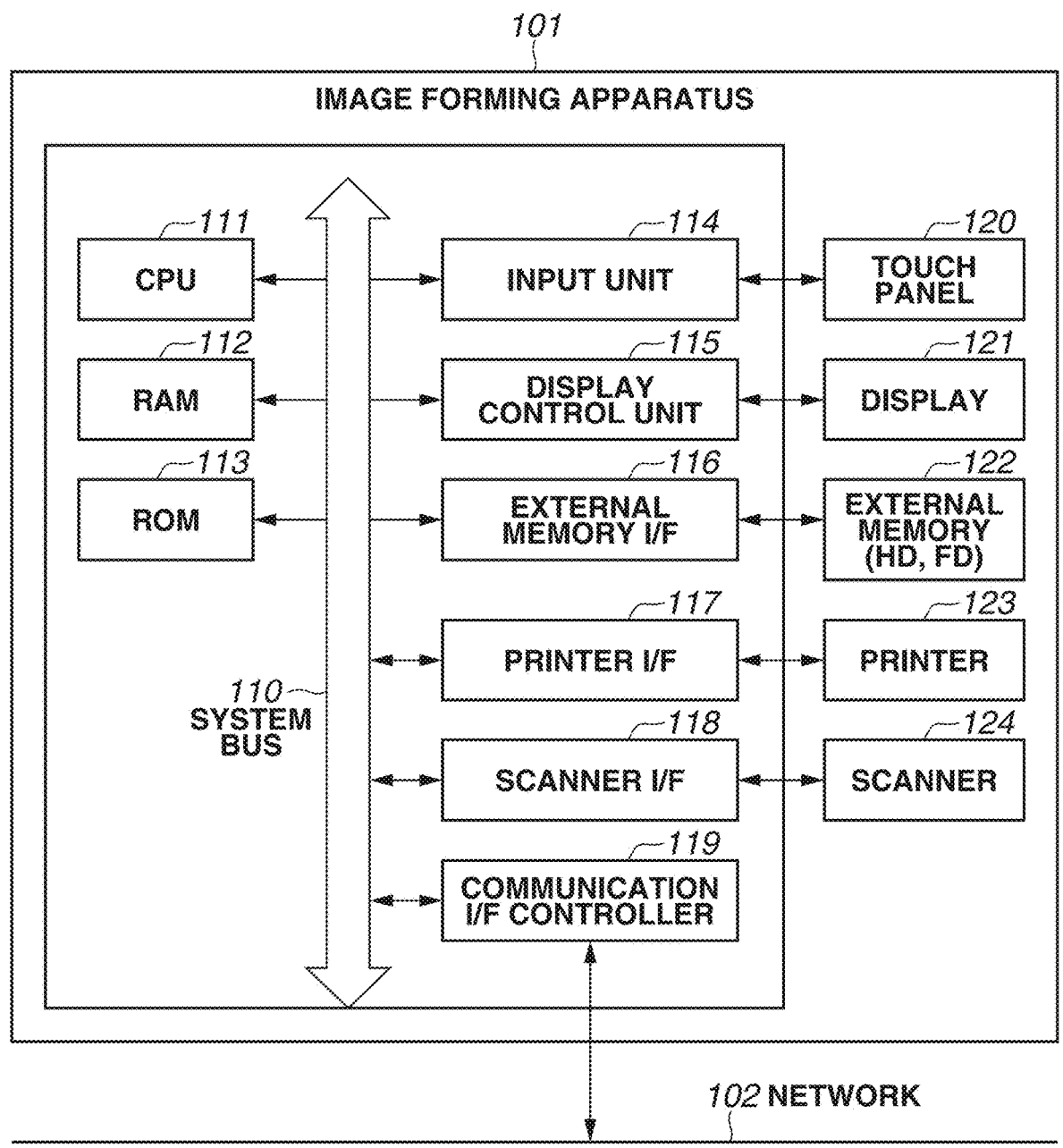
FIG. 1 illustrates a hardware configuration of an image forming apparatus according to exemplary embodiments of the present invention.

A first exemplary embodiment will be described below. FIG. 1 illustrates a hardware configuration of an image forming apparatus 101 to which each exemplary embodiment of the present invention is applicable.

A central processing unit (CPU) 111, a random access memory (RAM) 112, a read only memory (ROM) 113, an input unit 114, a display control unit 115, an external memory interface (I/F) 116, a printer I/F 117, a scanner I/F 118, and a communication I/F controller 119 are connected to a system bus 110. Further, a touch panel 120, a display 121, an external memory 122, a printer 123, and a scanner 124 are connected to the system bus 110. Each unit connected to the system bus 110 is configured to enable transmitting and receiving data to/from other units via the system bus 110. As used herein, the term "unit" generally refers to any combination of software, firmware, hardware, or other component, such as circuitry, that is used to effectuate a purpose.

The ROM 113, a nonvolatile memory, stores in respective predetermined areas image data, non-image data, and various programs for operation to be executed by the CPU 111. The RAM 112, a volatile memory, is used as a main memory for the CPU 111 and a temporary storage area such as a work area. The CPU 111 controls each unit of the image forming apparatus 101, for example, according to a program stored in the ROM 113 by using the RAM 112 as a work memory. Programs for operation to be executed by the CPU 111 are not necessarily stored in the ROM 113 and may be prestored in the external memory 122, such as a hard disk.

The input unit 114 receives a user operation, generates a control signal according to the operation, and supplies the control signal to the CPU 111. For example, the input unit 114 includes the touch panel 120 as an input device for receiving the user operation. The touch panel 120 is an input device for outputting coordinates information, for example, according to a touched position on the planarly configured input unit 114. Based on the control signal generated and supplied in response to the user operation performed on the input device, the CPU 111 controls each unit of the image forming apparatus 101 according to programs. Thus, the CPU 111 is able to instruct the image forming apparatus 101 to perform an operation in response to the user operation.

The display control unit 115 outputs a display signal for displaying an image to the display 121. For example, a display control signal generated by the CPU 111 according to a program is supplied to the display control unit 115. The display control unit 115 generates a display signal based on the display control signal, and outputs the display signal to the display 121. For example, based on the display control signal generated by the CPU 111, the display control unit 115 displays a graphical user interface (GUI) screen on the display 121.

The touch panel 120 is configured integrally with the display 121 to function as a touch panel display. For example, the touch panel 120 is configured so that transmissivity of light does not disturb display of the display 121, and is arranged on the upper layer of the display surface of the display 121. The input coordinates on the touch panel 120 are associated with the display coordinates on the display 121. Thus, a GUI can be configured to allow an operation as if the user directly operates the screen displayed on the display 121. The touch panel 120 may be any type, such as resistance film type, capacitance type, surface acoustic wave type, infrared-ray type, electromagnetic induction type, image recognition type, and optical sensor type.

The external memory 122, such as a hard disk, a compact disc (CD), a digital versatile disc (DVD), and a memory card, can be attached to the external memory I/F 116. Under the control of the CPU 111, the external memory I/F 116 writes and reads data to/from the attached external memory 122.

The printer 123 is connected to the printer I/F 117. Under the control of the CPU 111, image data to be printed by the printer 123 is transmitted to the printer 123 via the printer I/F 117 and then printed on a recording medium by the printer 123.

The scanner 124 is connected to the scanner I/F 118. Under the control of the CPU 111, the scanner 124 reads an image on a document to generate image data. The generated image data is stored in the RAM 112 and the ROM 113 via the scanner I/F 118. When the printer 123 performs printing based on the image data generated by the scanner 124, the copy function is achieved.

Under the control of the CPU 111, the communication I/F controller 119 performs communication with a network 102, such as a local area network (LAN), the Internet, and other wired and wireless networks. For example, image data generated by the scanner 124 can be transmitted to the outside via the network 102, and image data received from the outside via the network 102 can be printed by the printer 123.

The CPU 111 is able to detect, for example, the following operations and states of the touch panel 120: having touched the touch panel with the finger or pen (object) (hereinafter referred to as a "touch-down"), moving the finger or pen while keeping it in contact with the touch panel (hereinafter referred to as a "move"), a state where the finger or pen is held in contact with the touch panel (hereinafter referred to as a "touch-on"), and detaching the finger or pen from the touch panel (hereinafter referred to as a "touch-up"). The CPU 111 is further able to detect a touch-down in a software button area displayed on the display 121 and then detect that the finger or pen is moved out of the software button area while being held in contact with the touch panel (herein after referred to as an "exit"). The touch panel 120 is a multi-touch detectable touch panel. More specifically, even when a touch-down, a touch-on, a move, and a touch-up are performed by a plurality of fingers and pens at the same time, the touch panel 120 is able to detect respective operations and states. These operations and coordinates of a position touched by the finger or pen on the touch panel 120 are transferred to the CPU 111 via the system bus 110. The CPU 111 determines operation performed on the touch panel 120 based on the transferred information. For a move, the CPU 111 determines the moving direction of the finger or pen on the touch panel 120 based on changes of the position coordinates for each of the vertical and the horizontal components on the touch panel 120.

FIGS. 2A, 2B, 2C, and 3 illustrate screens displayed on the display 121 of the image forming apparatus 101.

The image forming apparatus 101 is provided with a copy function of optically reading an image of a document of a paper medium, converting the image into electronic data, performing image processing on the data, and printing the data on another paper medium. The image forming apparatus 101 is further provided with a "scan and send" function (send function) of transmitting the read electronic data to other apparatuses via the network 102. The image forming apparatus 101 is further provided with a "scan and store" function (box function) of storing the read electronic data in the external memory 122. The image forming apparatus 101 is further provided with a web browser function of arranging and displaying a Hyper Text Markup Language (HTML) contents acquired from an external server via the network 102. The image forming apparatus 101 independently stores the above-described functions as different applications in the ROM 113. The CPU 111 executes a required application according to a user's operation.

Figure 2A:
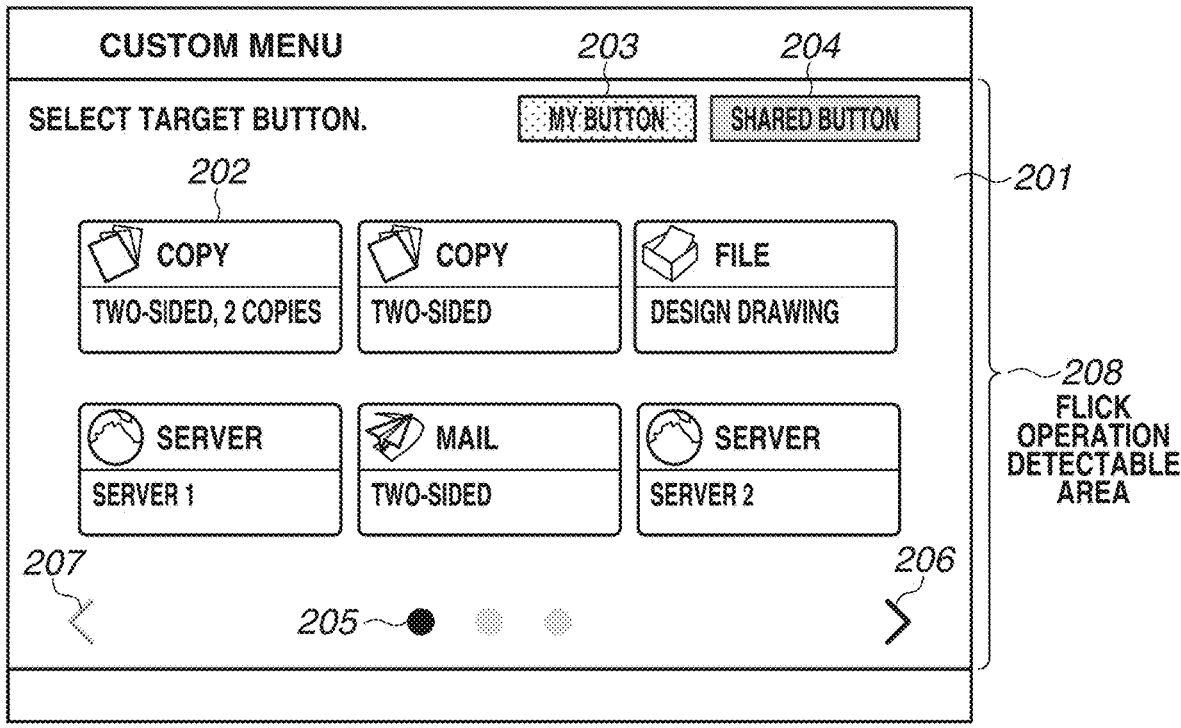
FIGS. 2A, 2B, and 2C illustrate examples of a custom menu screen displayed on a display of the image forming apparatus according to exemplary embodiments of the present invention.
Figure 2B:
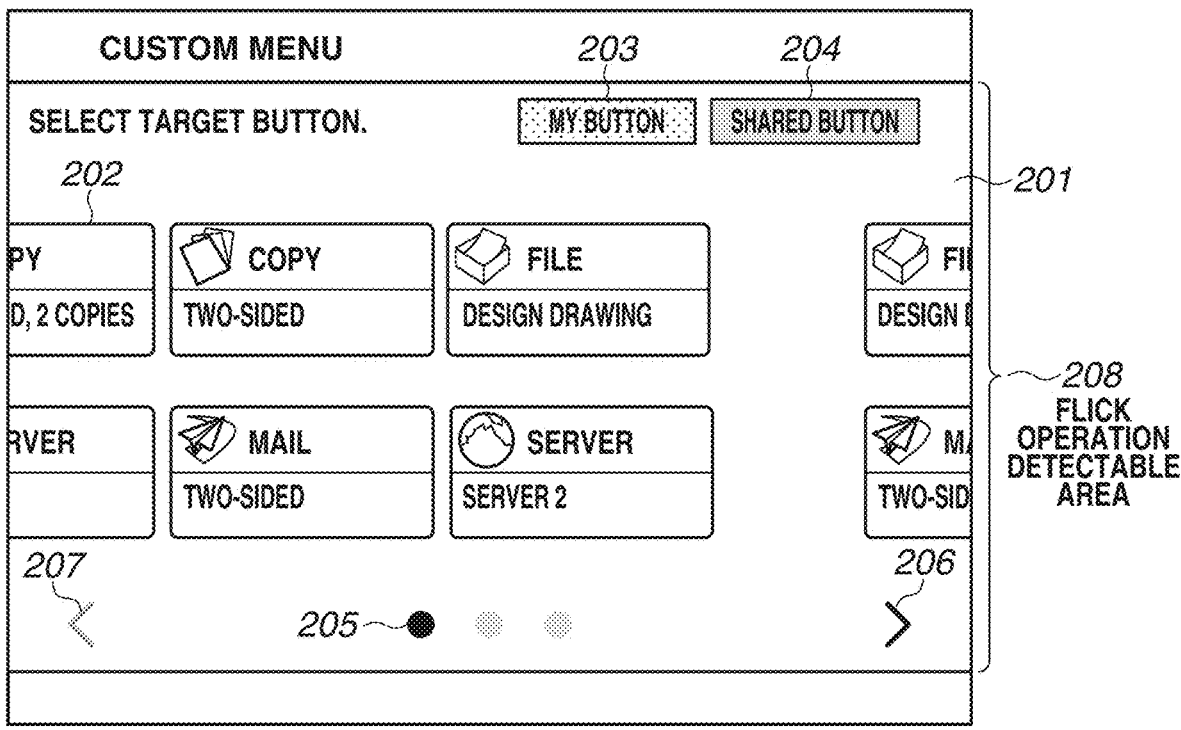
Figure 2C:
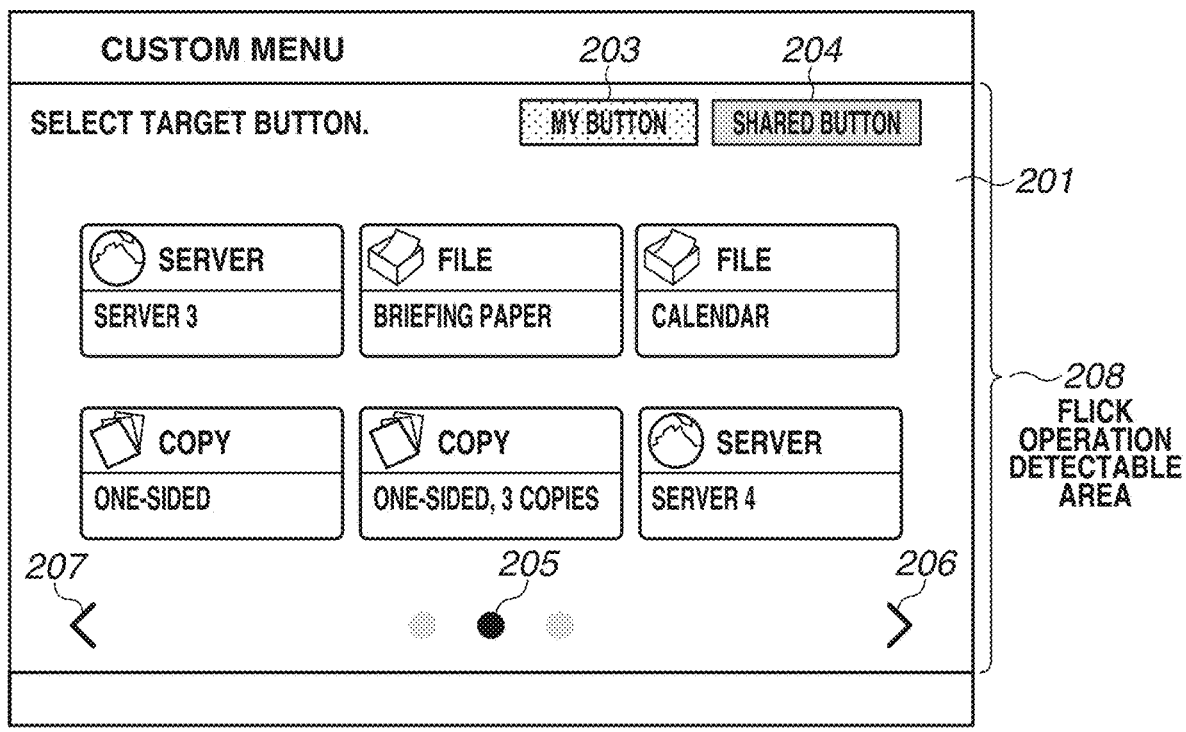

FIGS. 2A to 2C illustrate custom menu screens displayed on the display 121. The custom menu refers to a function of storing setting values of applications, displaying application buttons on a screen, and, when an application button is pressed, reproducing stored setting values and displaying a relevant application screen.

Referring to FIG. 2A, a button display area 201 displays application buttons for invoking different applications. Each of the application buttons displayed in the button display area 201 is associated with each application provided by the image forming apparatus 101 and relevant setting values. When the user presses an application button displayed in the button display area 201, the application screen associated with the relevant button is displayed and setting values associated with the button are reflected therein. Further, the application buttons displayed in the button display area 201 can also be associated with user information authenticated through user authentication. A title and a comment can be set to each application button displayed in the button display area 201. The user who registers the button is able to arbitrarily set the title and the comment. For example, a title "Copy" and a comment "Two-sided, 2 Copies" are displayed on a button 202. More specifically, each button displays an application name and an icon associated with the button, and a title and a comment regarding the setting values. The button 202 is associated with a copy application and associated with setting values for two-sided printing and 2 copies. When the user selects the button 202, the screen illustrated in FIG. 3 (described below) is displayed.

A my button 203 is used to display only application buttons associated with the currently authenticated user in the button display area 201. A shared button 204 is used to display only application buttons associated with all users, i.e., application buttons usable by all users in the button display area 201.

A page position display mark 205 schematically represents each page with a circle mark, indicating that a plurality of pages is virtually arranged in the horizontal direction. In this case, the page position display marks 205 indicate that the custom menu includes 3 pages and that the currently displayed screen is the first page (the page virtually arranged at the leftmost position).

The button display area 201 includes page change buttons 206 and 207. The page change button 206 is used to indicate change to the page virtually arranged to the right of the currently displayed page. The page change button 207 is used to indicate change to the page virtually arranged to the left of the currently displayed page. If there exists no page to the right or left of the currently displayed page, the page change button 206 or 207 is displayed in grayout (disabled). For example, referring to FIG. 2A, the button 207 is displayed in grayout because there exists no page to the left of the currently displayed page.

When the user presses the page change button 206 on the screen illustrated in FIG. 2A, the application button list in the button display area 201 scrolls to the left (see FIG. 2B) and the screen illustrated in FIG. 2C is displayed. On the screen illustrated in FIG. 2C, the page position display mark 205 indicating the currently displayed page has been moved to the middle, which indicates that the second page is currently displayed.

The custom menu screens illustrated in FIGS. 2A to 2C further include a flick operation detectable area 208 in which a flick or drag operation by the user can be detected. A flick operation is an operation in which the user quickly moves the finger while keeping it in contact with the touch panel over a predetermined distance and then detaches the finger. In other words, the user flips the surface of the touch panel with a quick movement of the finger. When the CPU 111 detects a touch-down in the flick operation detectable area 208, a move at a predetermined speed or faster over a predetermined distance or longer, and then a touch-up, the application button list scrolls following the finger motion and then the page changes. A drag operation is an operation to move the finger over a predetermined distance or longer keeping it in contact with the touch panel. When the CPU 111 detects a touch-down in the flick operation detectable area 208, a move over a predetermined distance or longer, and then a touch-on, the application button list scrolls following the finger motion and then the page changes. For example, when the user performs a flick operation from right to left in the flick operation detectable area 208 on the screen illustrated in FIG. 2A, the application button list scrolls to the left (see FIG. 2B) and the screen illustrated in FIG. 2C is displayed. When the user performs a flick operation from left to right in the flick operation detectable area 208 on the screen illustrated in FIG. 2C, the application button list scrolls to the right and the screen illustrated in FIG. 2A is displayed.

Figure 3:
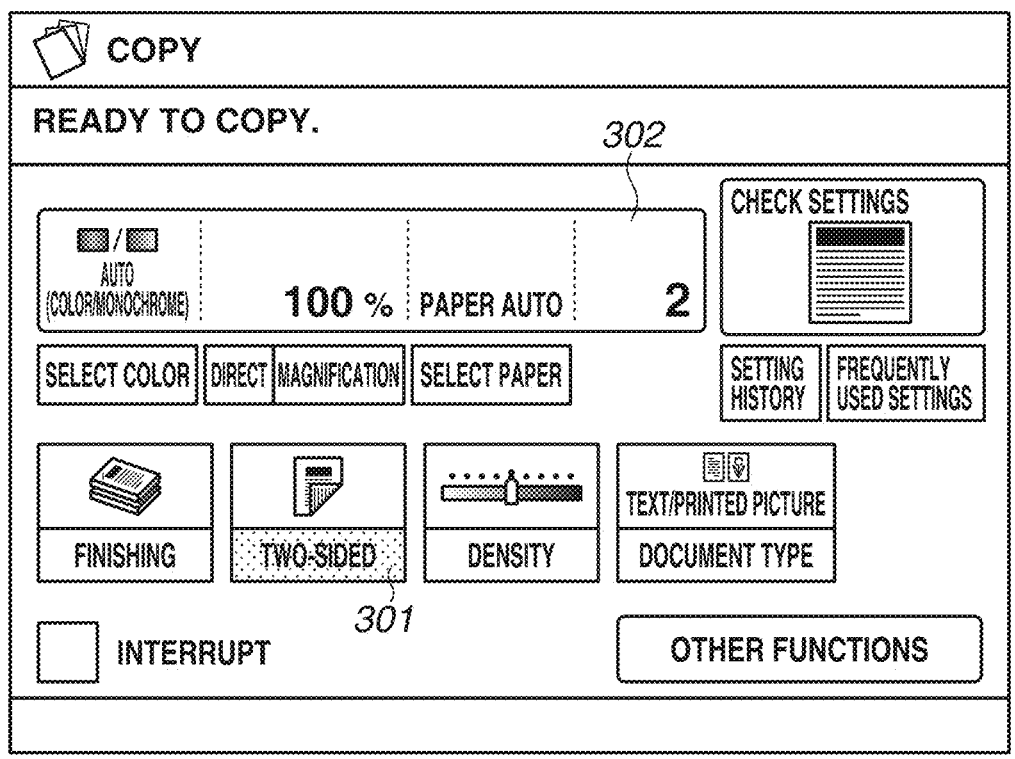
FIG. 3 illustrates an example of a copy application setting screen displayed on the display of the image forming apparatus according to exemplary embodiments of the present invention.

FIG. 3 illustrates a copy application setting screen displayed when the button 202 illustrated in FIG. 2A is selected. An icon 301 indicates setting of two-sided printing. An icon 302 indicates that the number of copies is set to 2. The copy application setting screen illustrated in FIG. 3 is a screen in which a flick or drag operation by the user is not detectable. Therefore, even if the user performs a flick or drag operation on the screen illustrated in FIG. 3, buttons are not scrolled and the screen is not changed.

Thus, screens displayed on the image forming apparatus 101 include screens having an area in which a flick operation is detectable (hereinafter simply referred to as a flickable area) and screens having only an area in which a flick operation is not detectable.

Figure 7A:
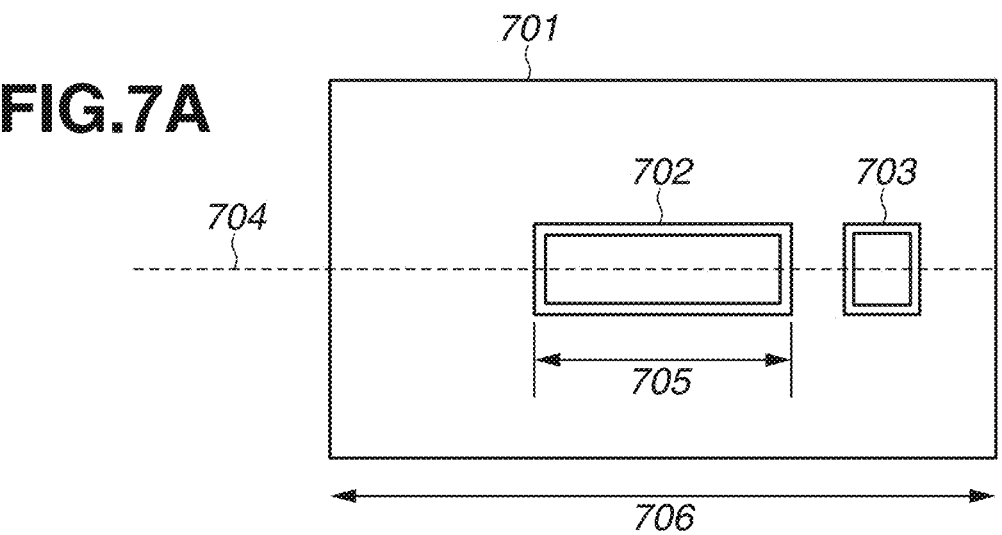
FIGS. 7A, 7B, 7C, and 7D illustrate button control on a touch panel display.
Figure 7B:
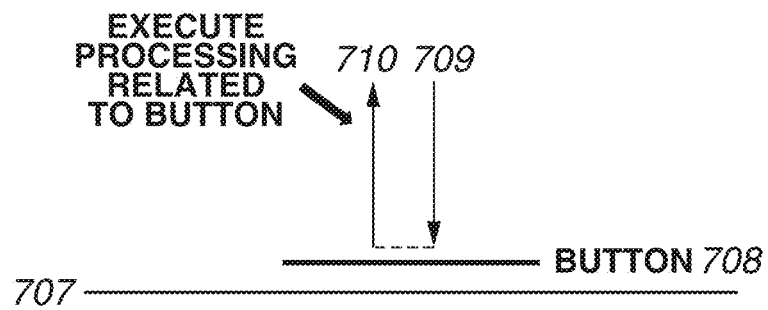
Figure 7C:
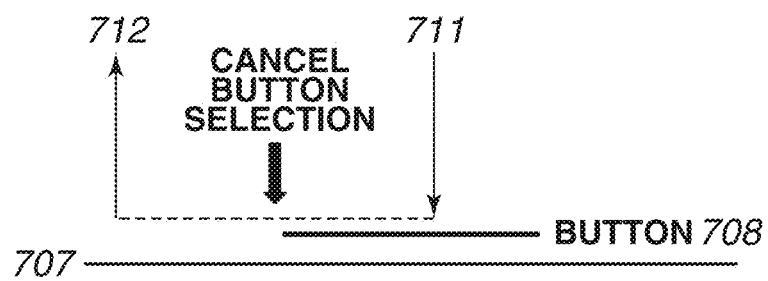
Figure 7D:
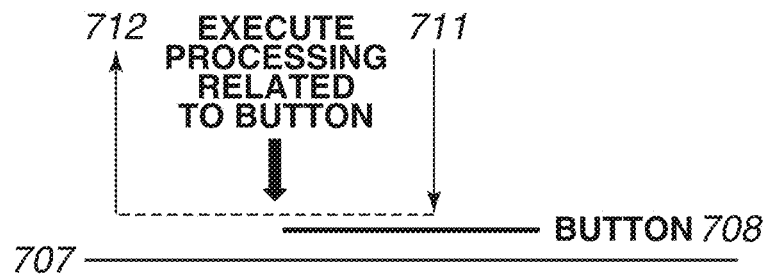

Button control on the touch panel display on the image forming apparatus 101 will be described in detail below. On the copy application setting screen illustrated in FIG. 3, when a touch-down is detected in a button area, the relevant button is put into a selection state (for example, the button is highlighted), as illustrated in FIG. 7B. When a touch-up is detected inside the button area, processing associated with the selected button is performed. Further, on the copy application setting screen illustrated in FIG. 3, button control as illustrated in FIG. 7C is not performed but button control as illustrated in FIG. 7D is performed. More specifically, when a touch-down is detected in a button area, the relevant button is put into the selection state. Then, when a move is detected and an exit is subsequently detected, processing associated with the selected button is performed. Also in each application screen ("scan and send", "scan and store", "web browser", etc.), similar button control to the one illustrated in FIG. 3 is performed.

Figure 4A:
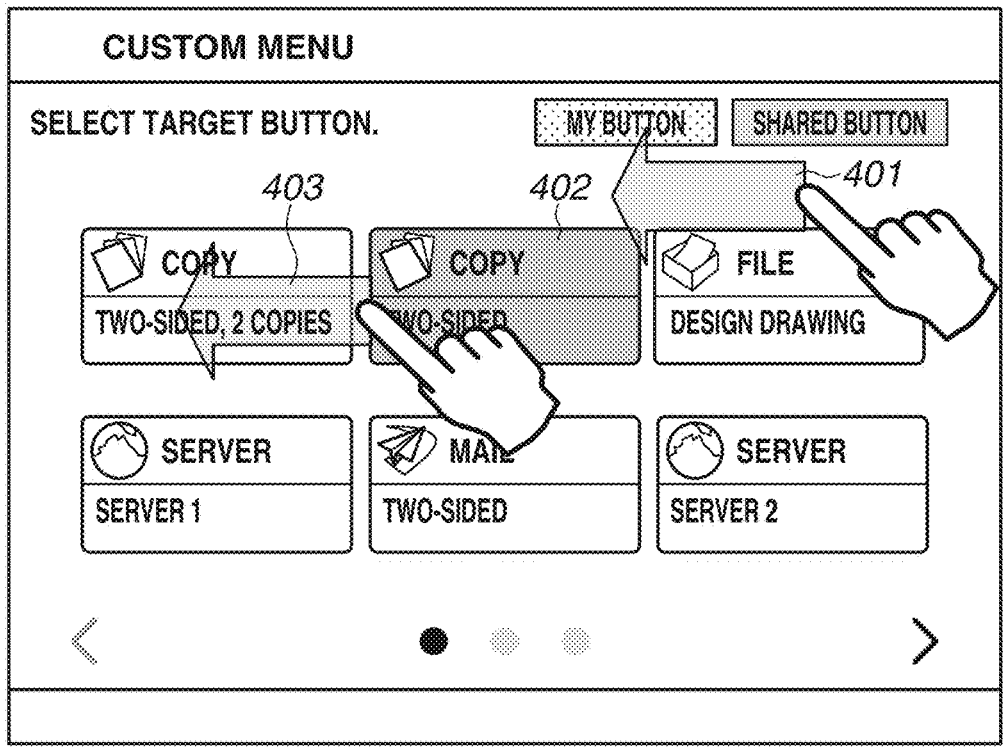
FIGS. 4A and 4B illustrate problems of the present invention.
Figure 4B:
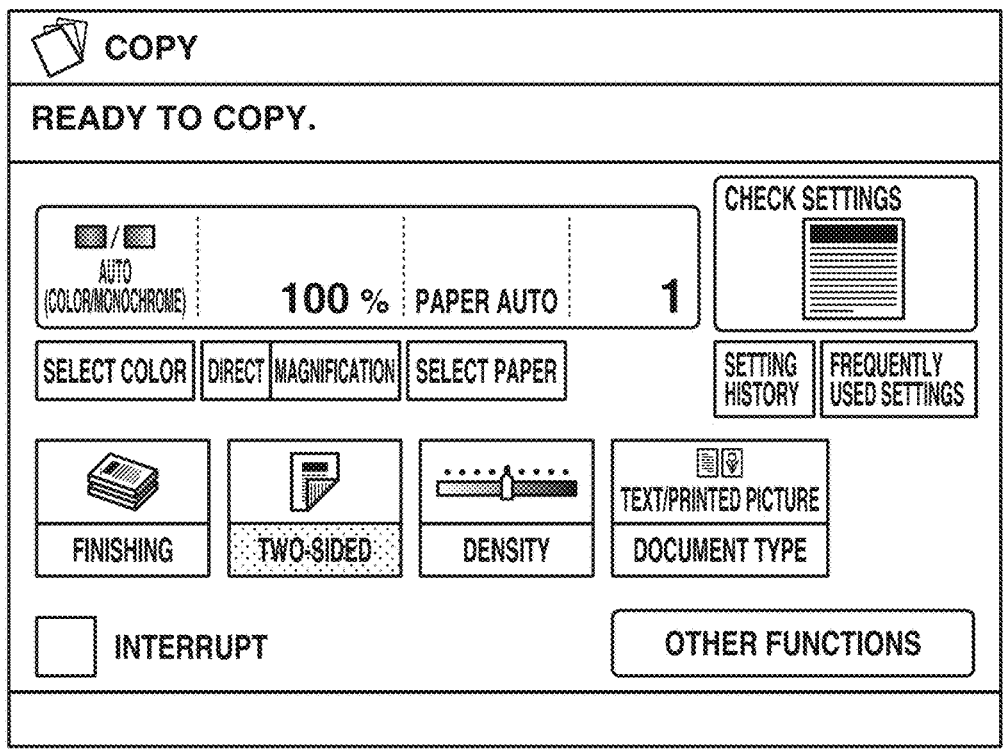

Meanwhile, when similar button control is performed on the custom menu screen illustrated in FIGS. 2A to 2C, a problem may arise when a flick or drag operation is performed. FIGS. 4A and 4B illustrate the relevant problem.

Referring to FIG. 4A, the user performs a flick operation to change pages. In this case, if the starting position of the flick operation (a touch-down detection position 401) is outside a button area, the application button list is scrolled according to the user's intention and the page is changed. On the other hand, if the starting position of the flick operation is in a button area, the button is put into the selection state (an application button 402 is highlighted in FIG. 4A) when a touch-down is detected. Then, when the user's finger is moved by a flick operation 403 outside the button area, an exit is detected and processing associated with the application button 402 will be performed. As a result, the screen will be changed to the copy application setting screen illustrated in FIG. 4B despite the user's intention to change pages in the custom menu screen. A similar problem occurs not only in a flick operation but also in a drag operation.

The image forming apparatus 101 according to the present exemplary embodiment performs control not to execute processing associated with the selected button even when a touch-down is detected in a button area in the flickable area, and an exit is subsequently detected. This enables preventing processing associated with the selected button from being performed despite the user's intention when the user performs a flick operation to change pages.

When an exit is detected, processing associated with the relevant button is not performed and the button selection is not canceled. The button selection is canceled when a move is detected, i.e., when the CPU 111 detects that the finger moves over a predetermined distance in the horizontal direction (X direction) from the touch-down detection position. The purpose of performing such control will be described below. For example, when operating a button having a comparatively small size such as the page change buttons 206 and 207, the finger may be moved outside the button area by slight motion of the finger although the user thinks the finger is placed inside the button area and then is detached from the relevant button area. In this case, if the button selection is canceled when an exit is detected, the execution of processing is canceled despite the user's intention and the page will not be changed. Therefore, with the above-described control, even if the finger is placed inside the button area and then moved outside the button area, processing associated with the selected button is performed as long as the operation is a move within a distance shorter than the predetermined distance. This enables achieving button control reflecting the user's intention.

Figure 5:
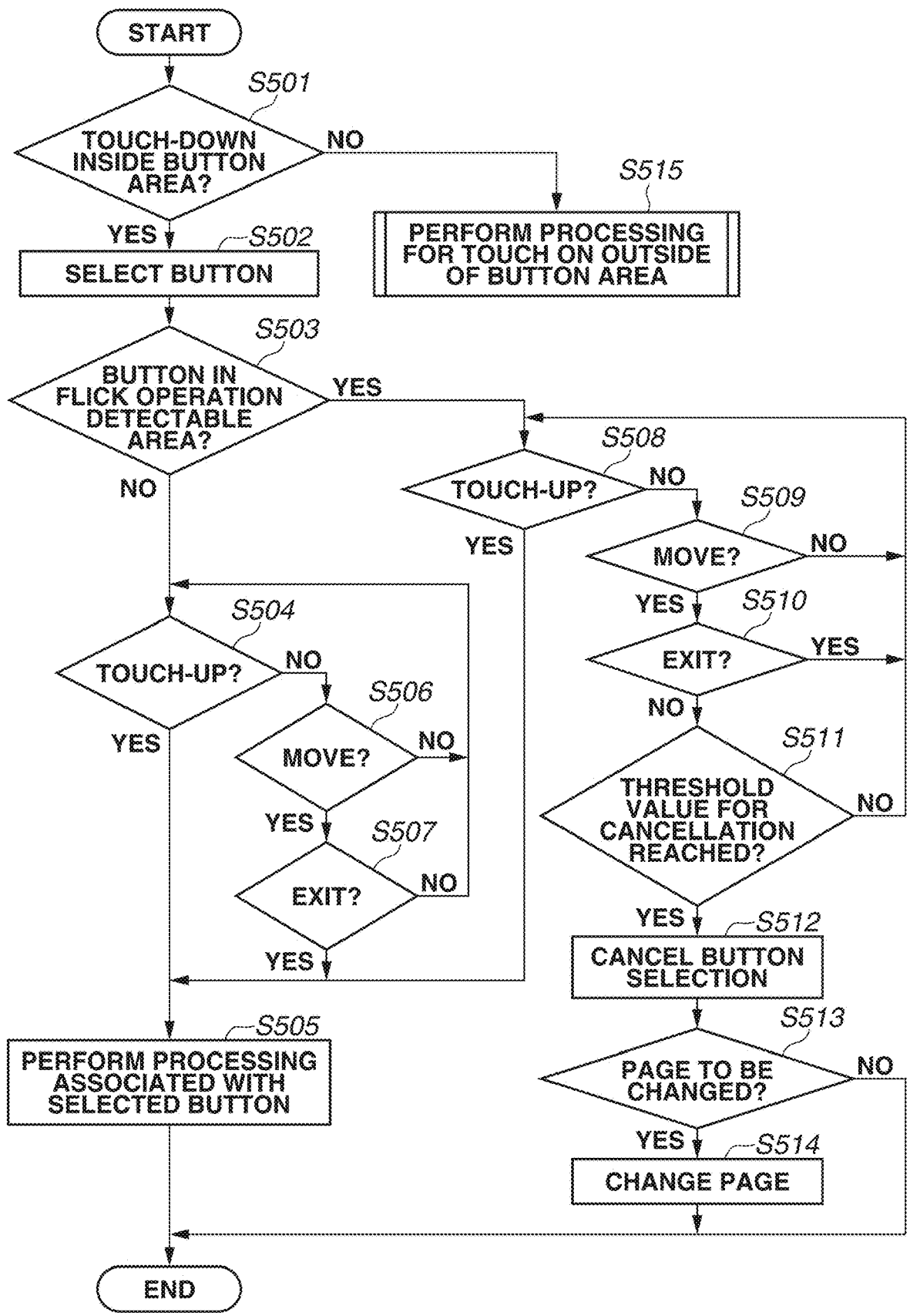
FIG. 5 is a flowchart illustrating operations of an image forming apparatus according to a first exemplary embodiment.

FIG. 5 is a flowchart performed by the image forming apparatus 101 when a touch operation is performed on the touch panel 120 by the user. Each step of the flowchart illustrated in FIG. 5 is implemented when the CPU 111 executes a program stored in the ROM 113 or the external memory 122.

In step S501, the CPU 111 determines whether a touch-down is detected in a button area. When a touch-down is detected outside the button area (NO in step S501), the processing proceeds to the step S515. In step S515, the CPU 111 performs processing for the case where the finger is placed outside the button area. For example, when the CPU 111 detects a touch-down a move at a predetermined speed or faster over a predetermined distance or longer, and then a touch-up in the flickable area (see FIG. 2A), the application button list scrolls following the finger motion and then the page changes. On the other hand, when the CPU 111 detects a touch-down outside the flickable area, the CPU 111 performs no specific processing. When a touch-down is detected in a button area (YES in step S501), then in step S502, the CPU 111 sets the relevant button in the selection state. The display control unit 115 highlights the button in the selection state to enable the user to recognize that the button is selected.

In step S503, the CPU 111 determines whether the button exists in the flickable area. When it is determined that the button does not exist in the flickable area (for example, a button in the copy application setting screen illustrated in FIG. 3) (NO in step S503), the processing proceeds to step S504. On the other hand, when it is determined that the button exists in the flickable area (for example, a button on the custom menu screen illustrated in FIGS. 2A to 2C) (YES in step S503), the processing proceeds to step S508.

When the CPU 111 detects a touch-up (YES in step S504), then in step S505, the CPU 111 performs processing associated with the selected button. Then, the processing exits the flowchart. When the CPU 111 does not detect a touch-up (NO in step S504) and detects a move (YES in step S506), then in step S507, the CPU 111 determines whether an exit is detected. When the CPU 111 detects an exit (YES in step S507), the processing proceeds to step S505. In step S505, the CPU 111 performs processing associated with the selected button. When the CPU 111 detects a move (YES in step S506), does not detect an exit (NO in step S507), and detects a touch-up (YES in step S504), the processing proceeds to step S505. More specifically, even in the case where the user touches the button area with the finger and then the finger is slightly moved, processing associated with the relevant button is performed when the finger is detached from the touch panel 120 as long as the finger is moved within the relevant button area.

When the CPU 111 detects a touch-up (YES in step S508), then in step S505, the CPU 111 performs processing associated with the selected button. When the CPU 111 does not detect a touch-up (NO in step S508) and detects a move (YES in step S509), the processing proceeds to step S510. When the CPU 111 detects an exit (YES in step S510), the processing returns to step S508. More specifically, in the case where a button is in the flickable area, even when the finger is moved outside the button area, processing associated with the selected button is not performed.

When the CPU 111 does not detect an exit (NO in step S510) and detects that the distance of a move from the touch-down position has reached a predetermined threshold value (YES in step S511), then in step S512, the CPU 111 cancels the button selection. The display control unit 115 restores the button in the selection state to the normal display state to enable the user to recognize that the button selection is canceled. When the user performs a flick or drag operation to change page, the CPU 111 determines that the distance of a move has reached the predetermined threshold value (YES in step S511).

In step S513, the CPU 111 determines whether the currently displayed page is to be changed. When the CPU 111 determines that the currently displayed page is to be changed (YES in step S513), then in step S514, the CPU 111 performs screen transition as illustrated in FIGS. 2A to 2C.

As described above, when a touch-down is detected in a button area on the touch panel display, the image forming apparatus 101 according to the present exemplary embodiment switches button control methods according to whether the button exists in the flickable area. More specifically, in the case where a button is in a flick operation undetectable area, the image forming apparatus 101 performs processing associated with the button when the user moves the finger outside the relevant button area. On the other hand, in the case where a button is in the flickable area, the image forming apparatus 101 performs control not to perform processing associated with the button when the finger is moved outside the relevant button area. Further, in the case where a button is in the flickable area, the image forming apparatus 101 cancels the button selection when the finger moves over a predetermined distance.

According to the present exemplary embodiment, it is possible to prevent selection of a button from being canceled despite the user's intention and to prevent processing associated with a button from being performed despite the user's intention when the user performs a flick or drag operation on the relevant button.

In the first exemplary embodiment described above, in a case where a touch-down is detected in a button area in the flickable area, processing associated with the button is not performed when the finger is moved outside the relevant button area. In the present exemplary embodiment, in the case where a button is in the flickable area but is not scrollable by a flick or drag operation, processing associated with the button is performed when the finger is moved out of the relevant button area, similar to a button in a flick operation undetectable area. Buttons not scrollable by a flick or drag operation are buttons other than the application buttons illustrated in FIGS. 2A to 2C, i.e., not scrollable buttons are the my button 203, the shared button 204, and the page change buttons 206 and 207. A second exemplary embodiment will be described below mainly with respect to differences from the first exemplary embodiment.

FIG. 6 is a flowchart illustrating operations of the image forming apparatus 101 according to the second exemplary embodiment. Steps identical to those of the flowchart illustrated in FIG. 5 are assigned the same step number. The flowchart illustrated in FIG. 6 differs from the flowchart illustrated in FIG. 5 in that processing in step S601 is added. The following descriptions will be made mainly with respect to the difference. Similar to the flowchart illustrated in FIG. 5, each step of the flowchart illustrated in FIG. 6 is implemented when the CPU 111 executes a program stored in the ROM 113 of the image forming apparatus 101 or the external memory 120.

When the button exists in the flickable area (YES in step S503), then in step S601, the CPU 111 determines whether the button is scrollable by a flick or drag operation. When the button is scrollable by a flick or drag operation (YES in step S601), the processing proceeds to step S508 and subsequent steps. When the button is not scrollable by a flick or drag operation (NO in step S601), the processing proceeds to step S504 and subsequent steps.

Thus, in the present exemplary embodiment, in the case of a button which is in the flickable area but is not scrollable by a flick or drag operation, processing associated with the button is performed when an exit is detected similar to the case of buttons in a flick operation undetectable area. Specifically, when a touch-down is detected in the button area, the image forming apparatus 101 according to the present exemplary embodiment switches button control methods according to whether the relevant button is scrollable by a flick or drag operation. More specifically, in the case of a button not scrollable by a flick or drag operation, the image forming apparatus 101 performs control to carry out processing associated with the button when the user subsequently moves the finger outside the button area. On the other hand, in the case of a button scrollable by a flick or drag operation, the image forming apparatus 101 performs control not to perform processing associated with the button when the finger is subsequently moved outside the button area. Then, the image forming apparatus 101 performs control to cancels the button selection when the finger is moved over a predetermined distance. It is considered that, when the user performs a flick operation, the user generally performs a direct operation on a scrollable button by touching it, and seldom performs a flick operation on a button not scrollable by a flick operation. Therefore, even in the case of a button which is in the flick operation detectable area 208 but is not scrollable, the user's operability can be improved by performing button control similar to button control in a flick operation undetectable area.

While the present disclosure has specifically been described based on exemplary embodiments, the present disclosure is not limited thereto but can be modified in diverse ways without departing from the spirit and scope thereof. Further, parts of the above-described exemplary embodiments may be suitably combined.

For example, display items which are in a scrollable manner displayed on the touch panel display are not limited to application buttons in the custom menu screen. The present disclosure may be applied to buttons which are in a scrollable manner displayed by a flick or drag operation on screens other than the custom menu screen. In addition to buttons, the present disclosure is also applicable to images, icons, and any other items, as long as it is in a scrollable manner displayed on a screen, and processing associated with the item is performed when a display item is pressed by the user. The present disclosure is applicable not only to display items which scroll in the horizontal direction but also to display items which scroll in the vertical and oblique directions and display items which scroll in all direction.

Although the above-described exemplary embodiments are described based on the image forming apparatus 101 having a plurality of functions such as a copy function and a scanner function, the present invention is also applicable to an image processing apparatus having only some of these functions. The present disclosure may be applied to other information processing apparatuses such as personal computers, personal digital assistants (PDAs) mobile phones, facsimiles, cameras, video cameras, and other image viewers.

As described above, according to the present exemplary embodiment, it is possible to prevent selection of a display item from being canceled despite the user's intention and, when a flick or drag operation is performed on a displayed item, to prevent processing associated with the display item from being performed despite the user's intention.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus including a touch panel display, the information processing apparatus comprising:
one or more memories that store instructions; and
one or more processors configured to execute the instructions stored in the one or more memories to:
detect that an instruction object touches the touch panel display, wherein a first screen and a second screen are configured to be displayed on the touch panel display, the first screen is a screen on which screen transition is possible by receiving a flick operation, and the second screen is a screen on which screen transition does not occur even when a flick operation is received,
when the instruction object with which a button included in the screen displayed on the touch panel display is touched is released from the touch panel display, processing associated with the button is performed,
wherein, when the instruction object with which a button included in the first screen is touched is released from the touch panel display by a user operation, in a case where the user operation is a flick operation, screen transition occurs without performing processing associated with the button, and
wherein, when the instruction object with which a button included in the second screen is touched is released from the touch panel display by a user operation, even if the user operation is a flick operation, processing associated with the button is performed.

2. The information processing apparatus according to claim 1, wherein the touch panel display includes at least a touch panel configured to receive an operation of the instruction object and a display configured to display the button.

3. The information processing apparatus according to claim 1, wherein the processing corresponding to the button is executed in a case where it is detected that the instruction object is touched in the area of the button displayed on the touch panel display and that the touched instruction object is detached in the area of the button before the touched instruction object is moved for the predetermined distance or more.

4. The information processing apparatus according to claim 1, wherein the first screen displayed on the touch panel display is shifted to a next screen at least on condition that the instruction object is touched in the area of the button displayed on the touch panel display and that the touched instruction object is moved for the predetermined distance or more.

5. The information processing apparatus according to claim 1, wherein the button is in a selected state in a case where the instruction object is touched in the area of the button included in the first screen, and the selected state is canceled in a case where the touched instruction object is moved for the predetermined distance or more.

6. The information processing apparatus according to claim 1, wherein the processing corresponding to the button is executed in a case where it is detected that the instruction object is touched in the area of the button included in the first screen and that the touched instruction object is moved out of the area of the button and detached before the touched instruction object is moved for the predetermined distance or more.

7. The information processing apparatus according to claim 1, wherein the processing corresponding to a button is not executed in a case where the instruction object is touched in an area of the button included in the first screen that the touched instruction object is detached in the area of the button after the touched instruction object is moved for the predetermined distance or more, and the processing corresponding to a button is executed in a case where the instruction object is touched in an area of the button included in the first screen and that the touched instruction object is detached in the area of the button after the touched instruction object is moved for the predetermined distance or more.

8. The information processing apparatus according to claim 1, wherein the information processing apparatus is an image processing apparatus including at least one of a print function, a copy function, and a scan function, and
wherein the first screen is a menu screen on which buttons for selectively performing any of a print function, a copy function, and a scan function are displayed, and the second screen is a function setting screen that is displayed after button selection made on the main screen.

9. The information processing apparatus according to claim 1, wherein the first screen is a screen on which scrolling occurs by receiving a flick operation or a drag operation, and the second screen is a screen on which scrolling does not occur by receiving a flick operation or a drag operation,
wherein, when the instruction object with which a button included in the first screen is touched is released from the touch panel display by a user operation, in a case where the user operation is a flick operation or a drag operation, screen transition occurs without performing processing associated with the button, and
wherein, when the instruction object with which a button included in the second screen is touched is released from the touch panel display by a user operation, even if the user operation is a flick operation or a drag operation, processing associated with the button is performed.

10. The information processing apparatus according to claim 1, wherein when the instruction object with which a button included in the second screen is touched moves on the touch panel display while keeping a touch state and then moves to outside of the button, processing associated with the button is performed.

11. A method of controlling an information processing apparatus including a touch panel display, the method comprising:
detecting that an instruction object touches the touch panel display, wherein a first screen and a second screen are configured to be displayed on the touch panel display, the first screen is a screen on which screen transition is possible by receiving a flick operation, and the second screen is a screen on which screen transition does not occur even when a flick operation is received,
when the instruction object with which a button included in the screen displayed on the touch panel display is touched is released from the touch panel display, processing associated with the button is performed,
wherein, when the instruction object with which a button included in the first screen is touched is released from the touch panel display by a user operation, in a case where the user operation is a flick operation, screen transition occurs without performing processing associated with the button, and
wherein, when the instruction object with which a button included in the second screen is touched is released from the touch panel display by a user operation, even if the user operation is a flick operation, processing associated with the button is performed.

12. An information processing apparatus including a touch panel display, the information processing apparatus comprising:
one or more memories that store instructions; and
one or more processors configured to execute the instructions stored in the one or more memories to
detect that an instruction object touches the touch panel display, wherein a first screen and a second screen are configured to be displayed on the touch panel display, the first screen is a screen on which scrolling is performed as instructed by an operation of moving the instruction object with which the touch panel display is touched by a predetermined movement distance or greater, and the second screen is a screen on which scrolling does not occur even when the operation is received,
when the instruction object with which a button included in the screen displayed on the touch panel display is touched is released from the touch panel display, processing associated with the button is performed,
wherein, when the instruction object with which a button included in the first screen is touched is released from the touch panel display by a user operation after being moved by the predetermined movement distance or greater, processing associated with the button is not performed, and
wherein, when the instruction object with which a button included in the second screen is touched is released from the touch panel display after being moved by the predetermined movement distance or greater, processing associated with the button is performed.

13. The information processing apparatus according to claim 12, wherein the first screen displayed on the touch panel display is shifted to a next screen at least on condition that the instruction object is touched in the area of the button displayed on the touch panel display and that the touched instruction object is moved for the predetermined distance or more.

14. The information processing apparatus according to claim 12, wherein the information processing apparatus is an image processing apparatus including at least one of a print function, a copy function, and a scan function.

15. The information processing apparatus according to claim 12, wherein the information processing apparatus is an image processing apparatus including at least one of a print function, a copy function, and a scan function, wherein the first screen is a menu screen on which buttons for selectively performing any of a print function, a copy function, and a scan function are displayed, and the second screen is a function setting screen that is displayed after button selection made on the menu screen.

16. The information processing apparatus according to claim 12, wherein the operation of moving the instruction object by the predetermined movement distance or greater is a drag operation or a flick operation.

17. The information processing apparatus according to claim 12, wherein when the instruction object with which a button included in the second screen is touched moves on the touch panel display while keeping a touch state and then moves to outside of the button, processing associated with the button is performed.

18. A method of controlling an information processing apparatus including a touch panel display, the method comprising:

detecting that an instruction object touches the touch panel display, wherein a first screen and a second screen are configured to be displayed on the touch panel display, the first screen is a screen on which scrolling is performed as instructed by an operation of having the instruction object with which the touch panel display is touched by a predetermined movement distance or greater, and the second screen is a screen on which scrolling does not occur even when the operation is received, when the instruction object with which a button included in the screen displayed on the touch panel display is released from the touch panel display, processing associated with the button is performed, wherein, when the instruction object with which a button included in the first screen is touched is released from the touch panel display by a user operation after being moved by the predetermined movement distance or greater, processing associated with the button is not performed, and wherein, when the instruction object with which a button included in the second screen is touched is released from the touch panel display after being moved by the predetermined movement distance or greater, processing associated with the button is performed.

* * * * *